United States Patent [19]

Shimizu et al.

[11] Patent Number: 5,667,033
[45] Date of Patent: Sep. 16, 1997

[54] ELECTRIC POWER STEERING SYSTEM

[75] Inventors: Yoshinobu Shimizu, Sakai; Shiro Nakano, Osaka, both of Japan

[73] Assignee: Koyo Seiko Co., Ltd., Osaka, Japan

[21] Appl. No.: 569,481

[22] Filed: Dec. 8, 1995

[30] Foreign Application Priority Data

Dec. 21, 1994 [JP] Japan ................................ 6-318759

[51] Int. Cl.⁶ ............................ B60R 21/00; B62D 5/04
[52] U.S. Cl. .......................... 180/272; 180/169; 180/446; 342/71; 340/904; 340/435
[58] Field of Search ........................... 180/272, 271, 180/280, 169, 446; 342/71, 70, 72; 367/909; 340/903, 904, 435

[56] References Cited

U.S. PATENT DOCUMENTS

| | | | |
|---|---|---|---|
| 4,766,421 | 8/1988 | Beggs et al. | 180/169 |
| 5,040,630 | 8/1991 | Morishita et al. | 180/446 |
| 5,302,956 | 4/1994 | Asbury et al. | 342/70 |
| 5,339,075 | 8/1994 | Abst et al. | 180/169 |
| 5,428,439 | 6/1995 | Parker et al. | 180/169 |

FOREIGN PATENT DOCUMENTS 6-76200  3/1994  Japan.

*Primary Examiner*—Eric D. Culbreth
*Assistant Examiner*—Peter C. English
*Attorney, Agent, or Firm*—Rabin, Champagne & Lynt, P.C.

[57] ABSTRACT

An electric power steering system of this invention can inform the driver of potential danger by providing control by way of safety precaution before a vehicle enters a dangerous situation. The occurrence of dangerous situations is determined based on a signal from an obstacle sensor. If a steering wheel is turned in a dangerous situation, a warning control is performed on a motor. The motor outputs a torque for t1 seconds, for example, which counters against turning of the steering wheel. Then, the motor enters a "non-assist" state wherein no current is applied thereto for t2 seconds. If an intermittent counter torque is applied by the motor, it is hard to turn the steering wheel and the steering wheel is caused to vibrate, thereby preventing the vehicle from being steered to collide with an obstacle and, warning the driver of the danger with vibration caused in the steering wheel.

10 Claims, 11 Drawing Sheets

ELECTRIC POWER STEERING SYSTEM

BACKGROUND OF THE INVENTION

1. Field of the Invention

The present invention relates in general to an electric power steering system and more particularly to an electric power steering system capable of informing a driver of potential danger by providing control by way of safety precaution before a vehicle enters a dangerous situation.

2. Description of the Prior Art

As a prior art system related to the present invention, a system for warning of a vehicle accidentally drifting out of the traffic lane is disclosed in Japanese Unexamined Patent Publication No.6-76200 (1994). This prior art system is mainly directed to a system for warning a driver when the vehicle starts drifting out of the lane as a result of his falling asleep. This system keeps watch on the traffic lane (a line on a road) using a television camera and gives a warning to the driver when the vehicle starts drifting out of the lane. To give the warning, a vibration actuator incorporated in the steering wheel directly vibrates a spoke portion of the steering wheel.

Dangerous situations which are expected to occur while the vehicle is moving include not only cases where the vehicle is not steered because the driver has fallen asleep behind the wheel, but also those where the driver is steering the wheel.

Referring to FIG. 1, suppose that Vehicle C1 in the left lane and Vehicle C2 in the right lane are moving in the same direction on a divided road R with two lanes each way; Vehicle C1 is running somewhat ahead relative to Vehicle C2, and Vehicle C2 is approaching Vehicle C1 from the right rear and is moving at a faster speed than Vehicle C1.

When the vehicles so positioned are moving, if the driver of Vehicle C1 is not aware of the approach of Vehicle C2 from the right rear and tries to change lanes, as shown by the broken line in the figure, a dangerous situation may occur which could cause a collision.

Such danger does not stem from the fact that the driver has, for example, fallen asleep behind the wheel and has not actively steered the vehicle, as is the case described in the prior art system, but rather results from the fact that the driver carelessly has failed to check his rear to make sure that he may safely change lanes and has turned the steering wheel.

The prior art system does not fully assure the prevention of occurrence of dangerous situations caused by such carelessness of the driver. It is extremely dangerous to cause vibration in the steering wheel in response to the detection of the white dividing line by the television camera when the driver is actively turning the steering wheel to change lanes.

SUMMARY OF THE INVENTION

In view of the foregoing, it is the main object of the present invention to provide a system performing control by way of safety precaution adapted to avoid dangerous situations which could be caused due to the intention of the driver to turn the steering wheel.

According to a mode of the present invention, an electric power steering system, which is combined with a steering mechanism including a steering wheel, and which has a motor for producing a steering assist force when the vehicle is steered by means of the steering wheel, is characterized by comprising:

obstacle detecting means for determining the presence of an obstacle in the periphery of the vehicle; and warning control means for driving the motor to cause vibration in the steering wheel when an obstacle is detected by the obstacle detecting means.

According to another mode of the invention, the aforesaid electric power steering system is characterized by further comprising means for determining whether the steering wheel is turned or not, wherein the warning control means drives the motor so as to vibrate the steering wheel stronger when the steering wheel is not turned than when it is turned.

According to another mode of the invention, it is characterized in that the warning control means does not perform the warning control when the steering wheel is within a range of play with the middle point at the center thereof, wherein the steering wheel is not practically involved in a steering operation.

According to still another mode of the invention, it is characterized in that the warning control means regulates a value of current and/or voltage applied to the motor to a predetermined target value, and fluctuates the target value cyclically when an obstacle is detected by the obstacle detecting means.

According to another mode of the invention, it is characterized in that the warning control means drives the motor as to produce an intermittent counteractive force that resists turning of the steering wheel.

According to yet another mode of the invention, it is characterized in that the warning control means provides control such that the motor alternates an "adverse-assist" state wherein the motor produces a counteractive force against turning of the steering wheel, and a "non-assist" state wherein the motor produces no counteractive force.

According to a mode of the present invention, in response to a potential danger introduced by the approach of an obstacle vibration is caused in the steering wheel thereby warning the driver of the potential danger. The vibration in the steering wheel is caused by, for example, cyclical fluctuation of a target control value of the motor. With the cyclical fluctuation of a target control value of the motor, the steering assist force produced by the motor cyclically fluctuates when the vehicle is steered by means of the steering wheel.

According to another mode of the invention, the steering wheel vibrates more strongly when the vehicle is moving straight with the steering wheel kept unturned than when the vehicle is steered to change its travelling course. Accordingly, when the vehicle is moving straight, the driver is assuredly warned of potential danger by a strong vibration of the steering wheel. On the other hand, while the steering wheel is being turned, strength of vibration of the steering wheel does not become stronger as the driver continues to turn the wheel, thereby warning the driver of danger without making the driver feel scared.

According to the present invention having the foregoing modes, when a dangerous situation is forecast, the driver is not to steer the vehicle to a more dangerous direction, whereby a traffic accident is avoided in advance and the safety of travelling is improved.

Particularly, a relatively strong vibration is caused in the steering wheel when the vehicle is moving straight, whereas a relatively mild vibration is caused when the vehicle is changing its travelling course, so that the travelling safety may be improved without making the driver feel scared.

DESCRIPTION OF THE EMBODIMENT

Figure 1:
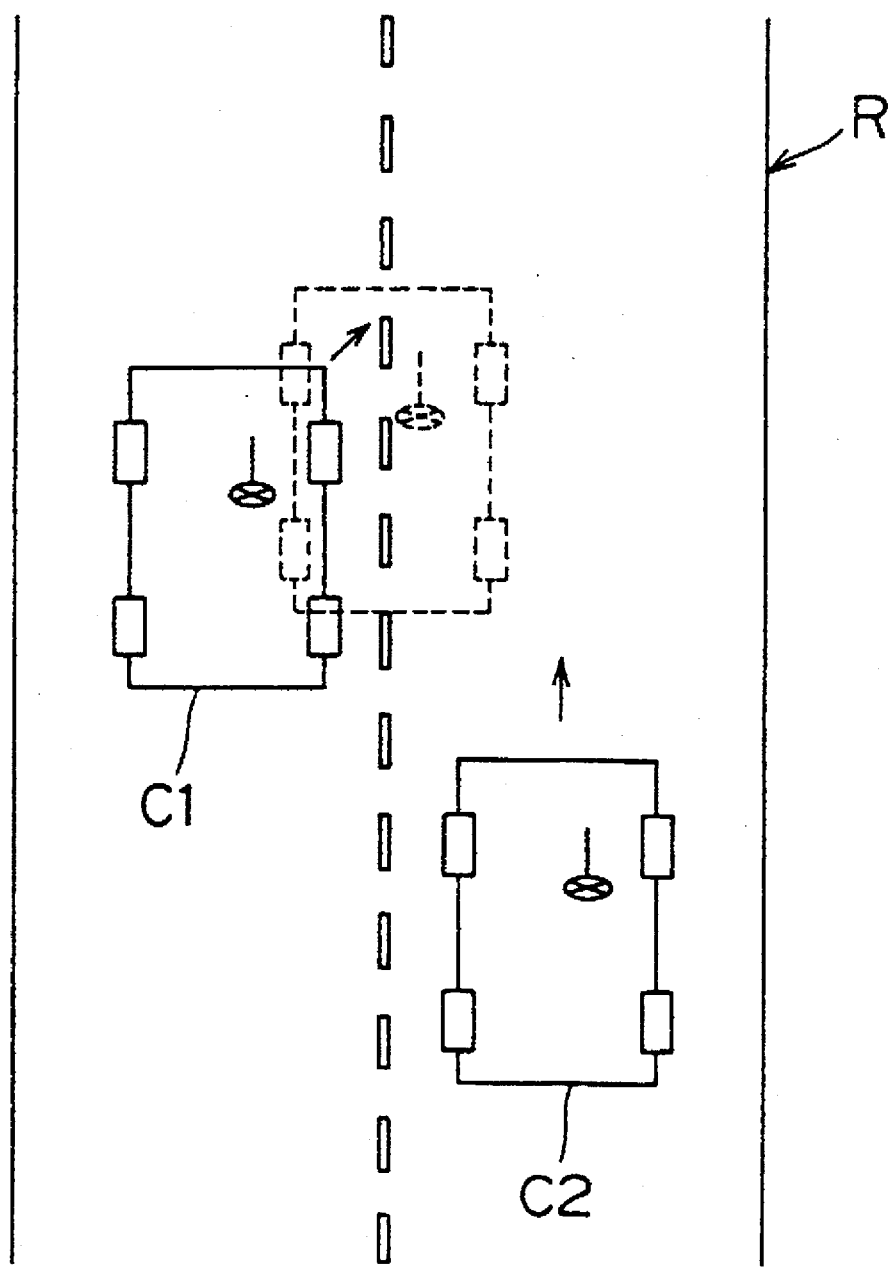
FIG. 1 is a diagram for illustrating a dangerous situation expected to occur while vehicles are moving.
Figure 2:
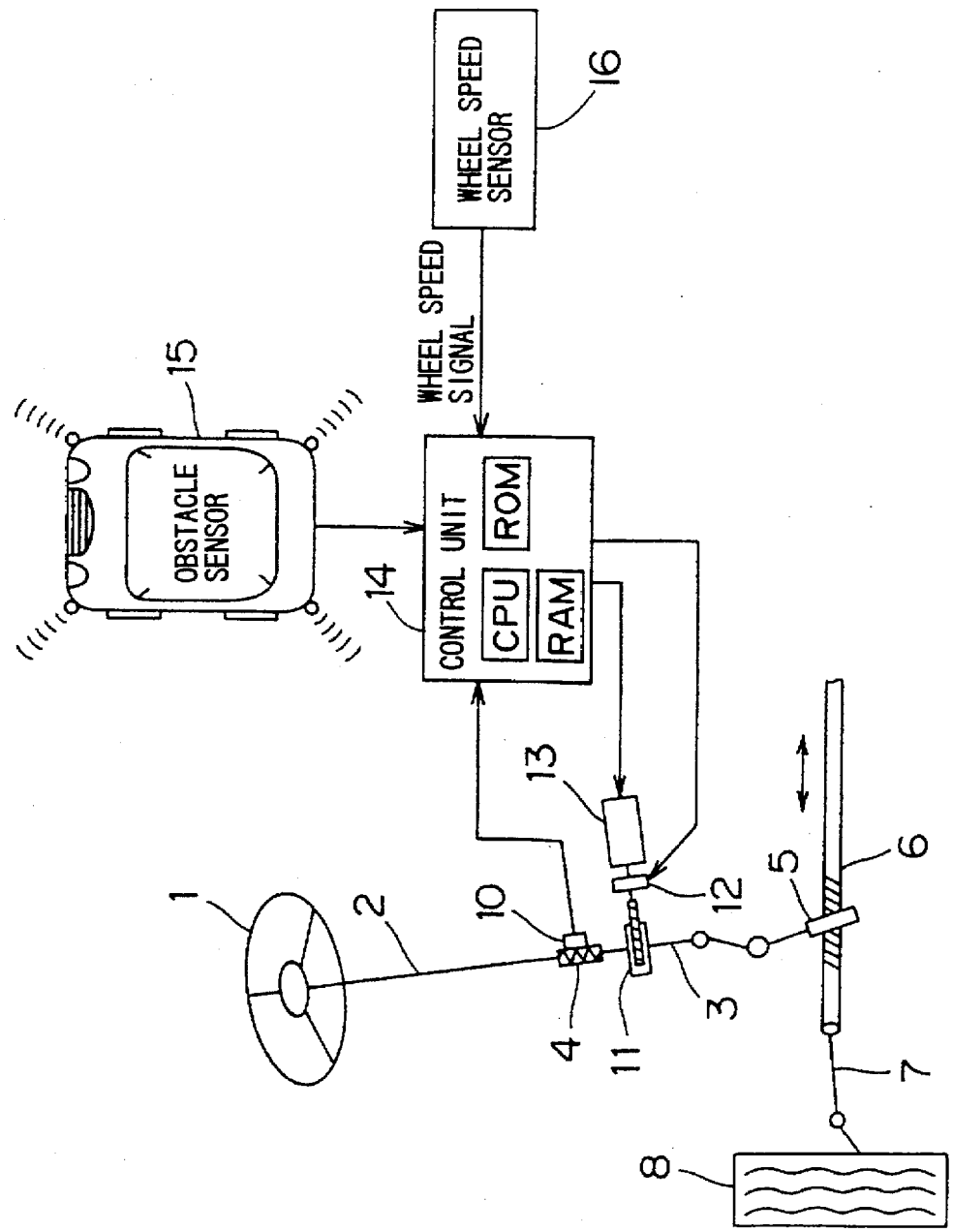
FIG. 2 is a diagram schematically illustrating the whole arrangement of an electric power steering system according to an embodiment of the present invention.

FIG. 2 is a diagram schematically illustrating the whole arrangement of an electric power steering system according to an embodiment of the present invention. Referring to FIG. 2 firstly, the arrangement and operations of an electric power steering system according to this embodiment of the present invention will be described.

A steering mechanism includes a steering wheel 1, an input shaft 2 connected to the steering wheel 1 and an output shaft 3 coupled to the input shaft 2. The input shaft 2 and the output shaft 3 are linked to each other by means of a torsion bar 4. Connected to the downstream side of the output shaft 3 is a pinion gear 5 which is meshed with a rack shaft 6 extending in the lateral direction of a vehicle. Tires 8 are connected to the rack shaft 6 by means of tie rods 7.

Such a steering mechanism incorporates an electric power steering system serving as a steering aid system. The electric power steering system includes a torque sensor 10 provided in association with the torsion bar 4, a decelerator 11 engaged with the output shaft 3, a motor 13 for applying a drive force through a clutch 12 to the decelerator 11 and a control unit 14. The control unit 14 is supplied with torque voltage $T_V$ from the torque sensor 10 and vehicle speed signals from a wheel speed sensor 16. It is also supplied with signals from an obstacle sensor 15.

The obstacle sensor 15 includes, for example, four sensors mounted to the four corner portions of the vehicle for outputting a signal indicative of the detection of an obstacle approaching any one of the right and left corners in the front and rear of the vehicle. The obstacle sensor may be a sensor, such as an ultrasonic sensor or an infrared ray sensor, which radiates a signal in the form of an ultrasonic wave or infrared rays to detect the reflection thereof. Alternatively, the obstacle sensor may be a combination of an image reading device, such as a CCD, and an image processing unit. Such an obstacle sensor 15 has been known in the art and therefore, the detailed description thereof is omitted.

During normal steering assist control wherein no signal is applied from the obstacle sensor 15, the control unit 14 regulates the value of current supplied to the motor 13 according to a torque voltage $T_V$ of the torque sensor 10 and a vehicle speed signal, and also regulates the on/off condition of the clutch 12. When a signal is supplied from the obstacle sensor 15, the control unit 14 performs warning control which will be described hereinbelow.

Now, operations during the normal steering assist control are described. Firstly, the input shaft 2 is rotated by a torque applied to the steering wheel 1. The output shaft 3 receives a load including a road reactive force applied through the pinion gear 5, the rack shaft 6, the tie rods 7 and the tires 8 which are coupled to the downstream side of the output shaft 3. Accordingly, the rotation of the input shaft 2 is not directly transmitted to the output shaft 3, but causes torsion in the torsion bar 4 because of the load affecting the steering system. The torsion, or a relative rotational angular displacement between the input shaft 2 and the output shaft 3, is detected as a torque voltage $T_V$ by the torque sensor 10 to be transmitted to the control unit 14. The control unit 14 in turn regulates the value of current supplied to the motor according to the torque voltage $T_V$ and a vehicle speed signal, so that the motor 13 may output a predetermined torque. The output torque is applied through the clutch 12 to the decelerator 11 to be amplified for the rotation of the output shaft 3. When it is not necessary to apply an output torque of the motor 13 to the output shaft 3, the clutch 12 is switched off by the control unit 14.

When the input shaft 2 is rotated either rightward or leftward by a torque applied to the steering wheel 1, the control unit 14 normally causes the motor 13 to produce a torque such that the output shaft 3 is rotated in the same direction as the input shaft 2 rotates. This reduces the load on the steering system which is received as a reactive force by the steering wheel 1, and thus the steering wheel 1 can be turned with less force.

Figure 3:
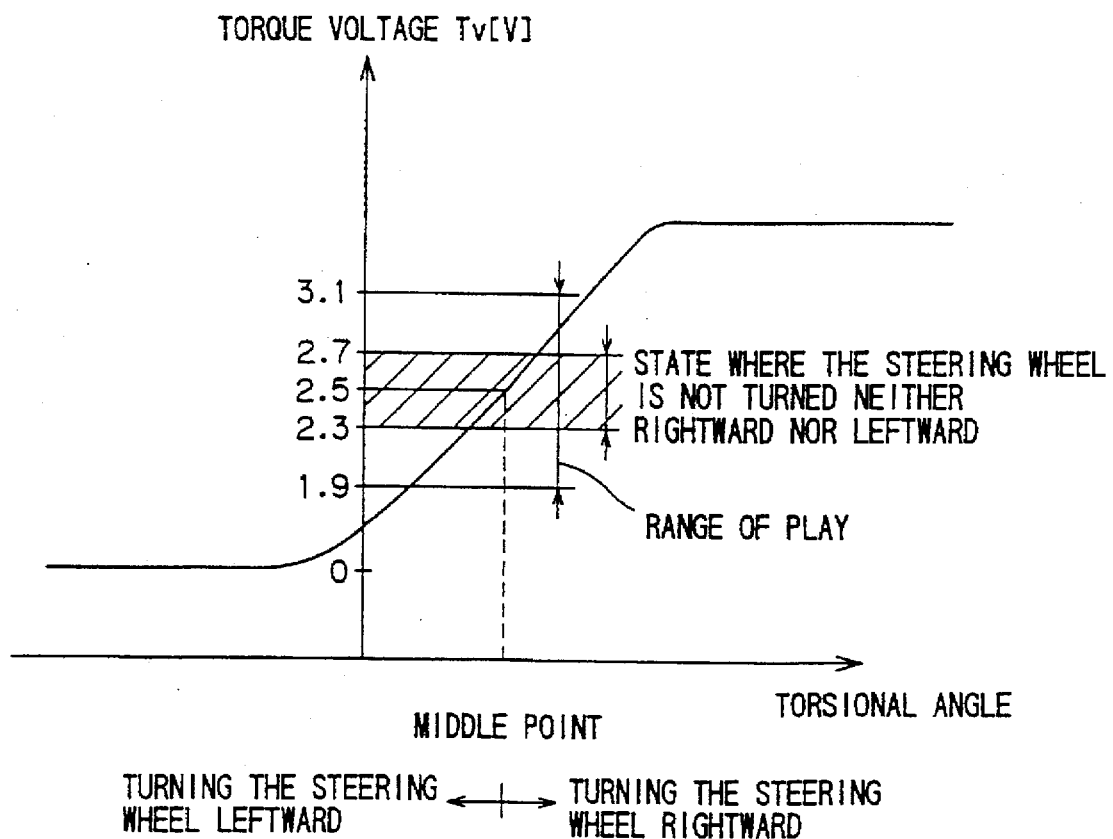
FIG. 3 is a graphical representation showing the relation between torque voltage $T_V$ and torsional angle.

FIG. 3 is a graphical representation showing the relation between a torque voltage $T_V$ supplied by the torque sensor 10 and a torsional angle which occurs in the torsion bar 4 (relative rotational angular displacement between the input shaft 2 and the output shaft 3).

In this embodiment, when the torque sensor 10 outputs the torque voltage of 2.5 V, as shown in FIG. 3, the steering wheel 1 is at the middle point with the input shaft 2 receiving neither a rightward nor a leftward torque. When the steering wheel 1 is turned to the right, the input shaft 2 is rotated rightward but the output shaft 3 cannot follow the rotation of the input shaft 2 because of the load, and thus torsion is caused in the torsion bar 4. The torque voltage $T_V$ of the torque sensor 10 varies corresponding to a degree of torsion in the torsion bar 4. When the steering wheel 1 is turned to the right, the greater the amount of torsion, the greater the value of the torque voltage $T_V$. Conversely when the steering wheel 1 is turned to the left, the torque voltage $T_V$ of the torque sensor 10 decreases inversely of the amount of torsion. When a torque voltage $T_V$ of the torque sensor 10 is in the range of 2.3 V$\leq T_V\leq$2.7 V wherein 2.5 V is at the center thereof, which 2.5 V is a value when the steering wheel 1 is positioned at the middle point, it may be considered that the steering wheel 1 has returned substantially to the middle point (in a state where the steering wheel 1 is turned neither rightward nor leftward), and therefore, the same control operation may be performed as when the steering wheel 1 is at the middle point. When a torque voltage $T_V$ is in the range of 1.9 V<$T_V$<3.1 V, the steering wheel 1 is in a so-called range of play. When the steering wheel 1 is in this range of play, the steering wheel 1 is not practically involved in the steering operation, and therefore, the warning control to be described hereinbelow is not performed.

When the steering wheel 1 is turned and the vehicle actually changes its travelling course, a level of the torque voltage $T_V$ is, for example, 3.1 V or more if it is turned rightward; whereas, a level of the torque voltage $T_V$ is, for example, 1.9 V or less if it is turned leftward.

During the normal steering assist control, the control unit 14 shown in FIG. 2 regulates the value of current applied to the motor 13 in accordance with a torque voltage $T_V$ of the torque sensor 10, which varies as shown in FIG. 3, and also regulates the vehicle speed signal. More specifically, when the value of the torque voltage $T_V$ exceeds 2.7 V, the motor 13 is caused to rotate rightward, for example, thereby producing a steering assist torque for rotating the output shaft 3 rightward (in the same direction as the steering wheel 1 is turned).

Conversely when the value of the torque voltage $T_V$ is lower than 2.3 V, the motor 13 is caused to rotate leftward, for example, thereby producing a steering assist torque for rotating the output shaft 3 leftward.

In this embodiment, the direction of the steering assist torque produced by the motor 13 is switched either rightward or leftward by switching the rotational direction of the motor 13. Instead of switching the rotational direction of the motor 13, the decelerator 11 may be utilized to mechanically switch the direction of the steering assist torque applied to the output shaft 3.

Figure 4:
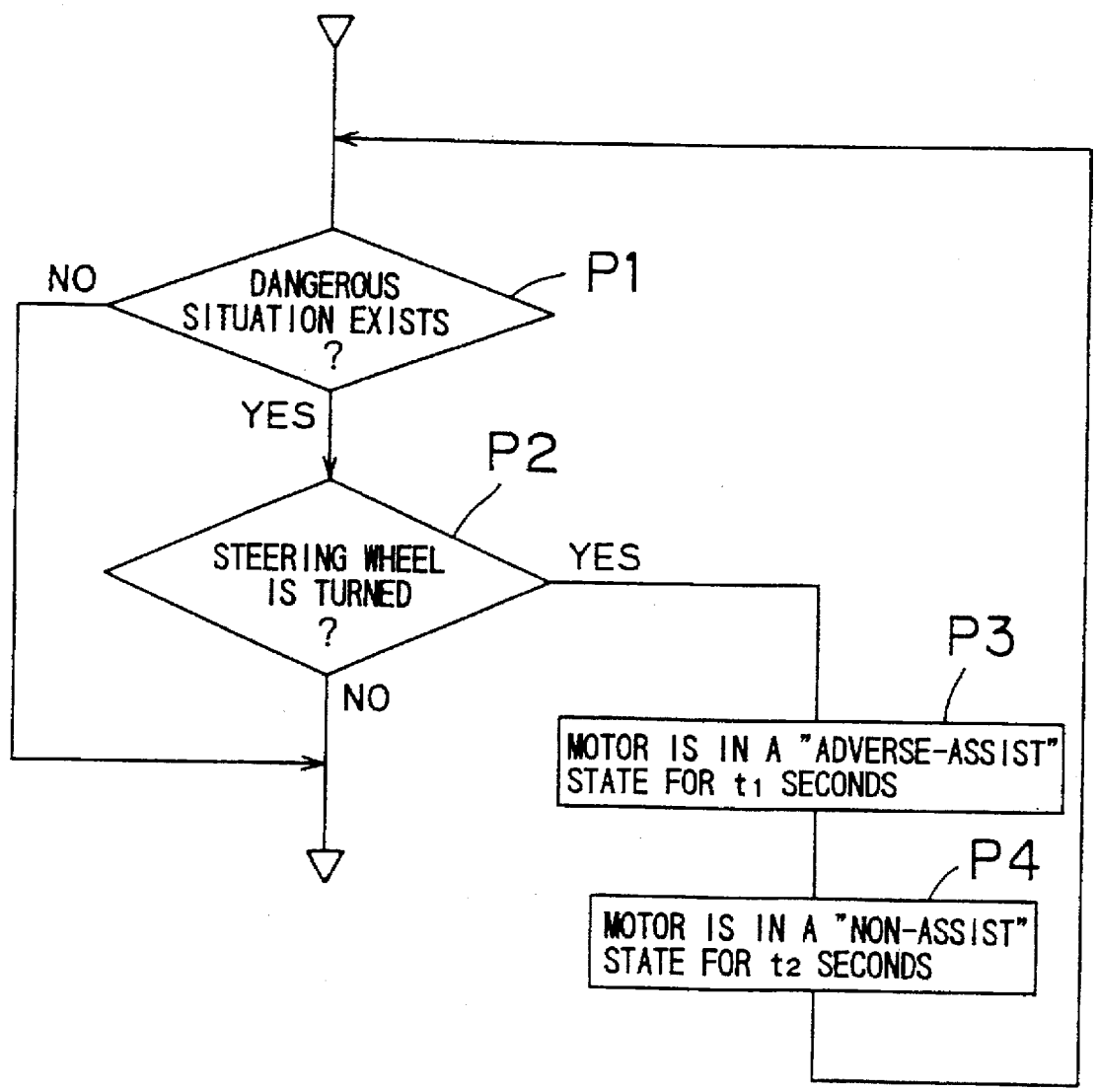
FIG. 4 is a flow chart schematically illustrating an outline of a warning control in an electric power steering system according to an embodiment of the present invention.

FIG. 4 is a flow chart schematically illustrating an outline of a routine of the warning control by way of safety precaution, in an electric power steering system according to the embodiment of the present invention.

Referring to FIG. 4, the control unit 14 firstly determines whether any dangerous situation exists or not (Step P1), based on a signal from the obstacle sensor 15. In a dangerous situation, it determines whether the steering wheel 1 is turned to the right or to the left, in response to a predetermined torque voltage $T_V$ (e.g., $T_V \geq 3.1$ V, or $T_V \leq 1.9$ V) applied from the torque sensor 10 ("YES" in Step P2). According to the determination, the control unit 14 performs on the motor 13 the following warning control instead of the normal steering assist control.

It causes the motor 13 to output a torque for t1 seconds, which operates to rotate the output shaft 3 in a direction counter to that in which the steering wheel is turned. Such a torque in the counter direction is applied for a fractional moment, such as 0.01 seconds, and therefore, the output shaft 3 is not actually turned in the counter direction but a steering force through the input shaft 2 and a steering assist torque applied in the counter direction by the motor 13 offset each other so that the output shaft 3 is substantially locked (Step P3). Thereafter the motor 13 is in a "non-assist" state for t2 seconds in which the motor 13 outputs no torque (Step P4).

If it is determined that the dangerous situation still exists (Step P1) and then determined that the steering wheel 1 is turned (Step P2), the "adverse-assist" state in Step P3 and the "non-assist" state in Step P4 are repeated alternatively.

This is how the warning control by way of safety precaution proceeds in this embodiment. During the warning control operations, the alternation between the "adverse-assist" state and the "non-assist" state causes the steering wheel 1 to vibrate in a certain rhythmic pattern, whereby the steering wheel is hardly turned, and thus, the driver may be informed of the occurrence of danger. Additionally, the driver is inhibited from steering the vehicle toward where the danger might be occurred, so that a collision may be avoided in advance.

Instead of entering the "non-assist" state in Step P4, the motor 3 may produce a weaker "adverse assist" torque than that of Step P3 or produce a little assist torque.

With reference to the detailed flow charts, more specific content of the warning control will be described.

Figure 5:
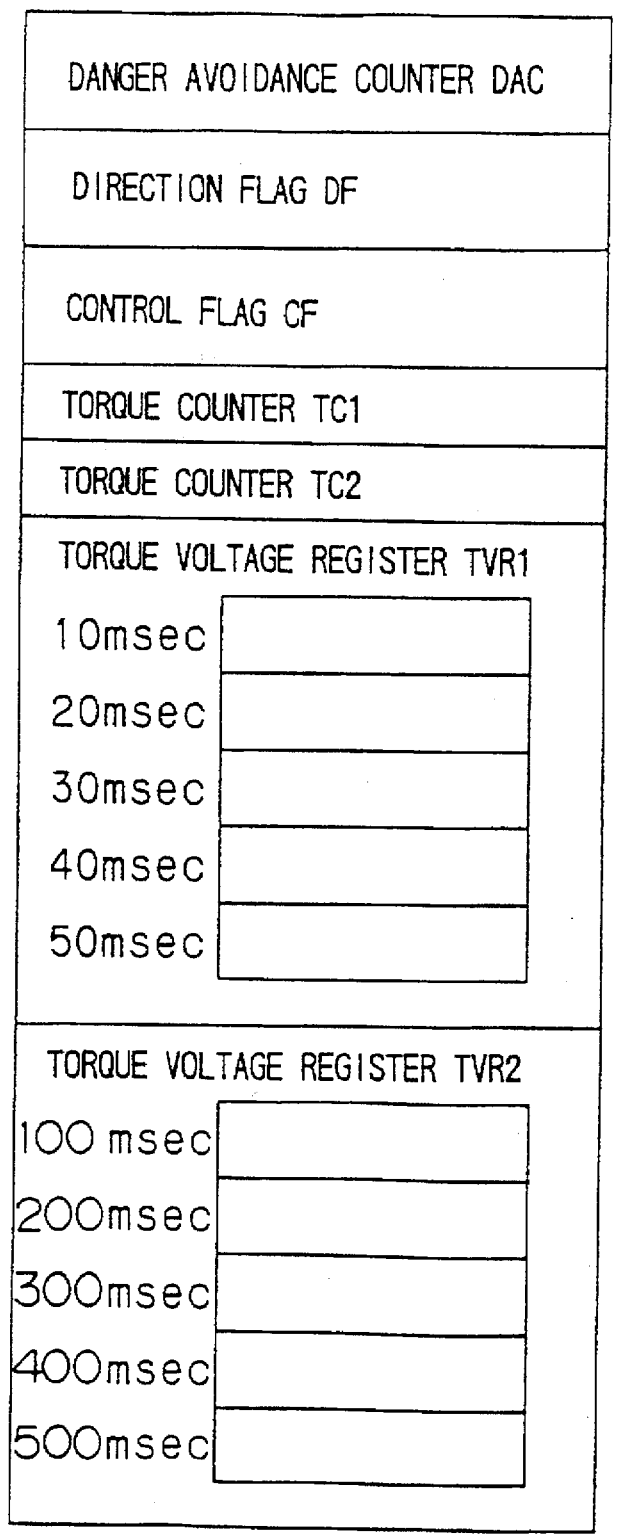
FIG. 5 is a memory map showing the content of a memory of a control unit.

FIG. 5 is a memory map showing the content of a memory which is required in the control unit 14 (see FIG. 2) for performing specific controls. The control unit 14 comprises electronic devices such as CPU, ROM and RAM. The content of the memory map shown in FIG. 5 is stored, for example, in RAM.

As shown in FIG. 5, the control unit 14 comprises a danger avoidance counter DAC, a direction flag DF, a control flag CF, a torque counter TC1, a torque counter TC2, a torque voltage register TVR1 and a torque voltage register TVR2. The danger avoidance counter DAC counts the number of times of warning control execution. The direction flag DF is required for determining which direction, rightward or leftward, the steering wheel 1 is turned; if the steering wheel 1 is turned to the right, it is set to "0", whereas if the steering wheel 1 is turned to the left, it is set to "1". The control flag CF determines whether the steering wheel 1 is returned to the middle point or not; each time the steering wheel 1 returns to the middle point, it is set to "0". The torque counter TC1 counts the timing of sampling of the torque voltage $T_V$ applied by the torque sensor 10; it outputs a signal indicative of a timing to sample the torque voltage $T_V$ every 10 millisecond period, and during this period 20 0.5 millisecond interruptions are counted. The torque counter TC2 counts the timing of sampling of the torque voltage $T_V$ applied by the torque sensor 10; it outputs a signal indicative of a timing to sample a torque voltage $T_V$ every 100 millisecond period, and during this period 200 0.5 millisecond interruptions are counted. The torque voltage register TVR1 holds the latest five sampled torque voltages at 10 milliseconds intervals if a torque voltage $T_V$ is sampled in response to each timing signal applied by the torque counter TC1. The torque voltage register TVR2 holds the latest five sampled torque voltages at 100 milliseconds intervals if a torque voltage $T_V$ is sampled in response to each timing signal applied by the torque counter TC2.

Out of the counters, flags and registers shown in FIG. 5, the danger avoidance counter DAC and the torque counter TC1 are used for control after having been set to "0" by an initialization routine.

Figure 6:
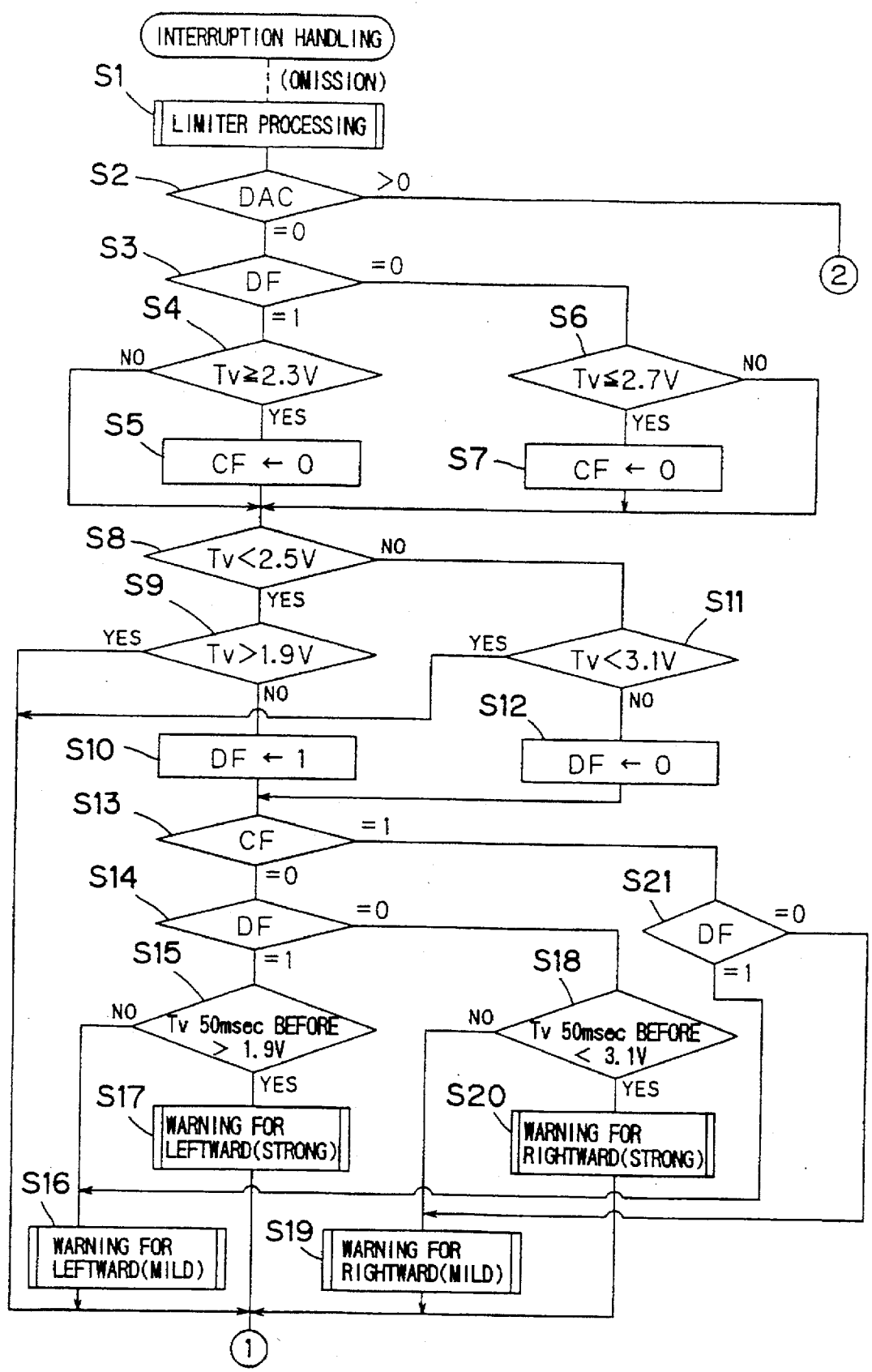
FIG. 6 is a flow chart showing an initial part of the routine of warning control performed by a control unit.
Figure 7A:
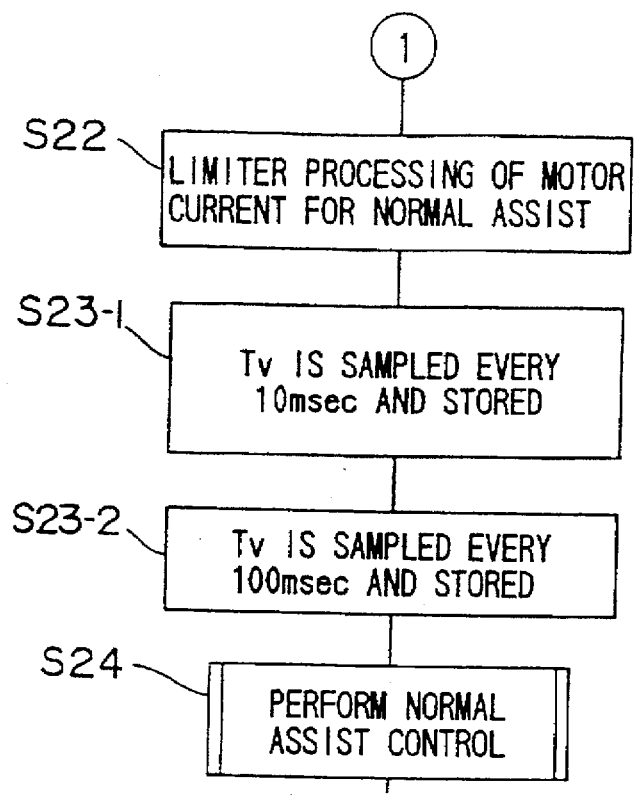
FIGS. 7A and 7B are continuations of the flow chart of FIG. 6.
Figure 7B:
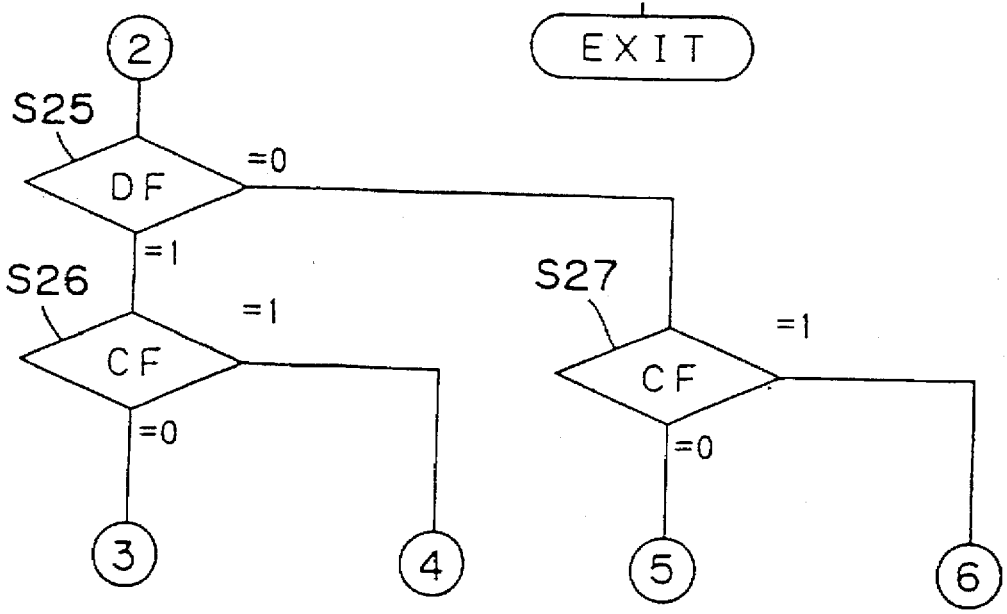

FIGS. 6 and 7 are flow charts together showing the routine of the warning control performed by the control unit 14.

The warning control is executed by way of interrupt handling which occurs, for example, every 0.5 milliseconds.

In this control, a current applied to the motor 13 during the normal steering assist control is first subjected to a limiter processing (Step S1).

In the subsequent Step S2, whether the danger avoidance counter DAC is "0" or not is determined. If DAC is not "0", any of the warning controls has already started, and therefore, the flow proceeds directly to Step S25 described hereinbelow.

If, on the other hand, the danger avoidance counter DAC is "0", the normal steering assist control is still underway. In this case, whether the direction flag DF is "0" or "1" is determined (Step S3). That is, whether the steering wheel 1 has turned the input shaft 2 to the right or to the left is determined. If the direction flag DF is "1" indicating that the input shaft 2 has been turned to the left, then whether a level of the torque voltage $T_V$ is 2.3 V or more is determined (Step S4). On the other hand, if the direction flag DF is "0"

indicating that the input shaft 2 has been turned to the right, then whether a level of the torque voltage $T_V$ is 2.7 V or less is determined (Step S6).

As shown in FIG. 3, when the level of the torque voltage $T_V$ is 2.3 V or more despite the leftward turning of the input shaft 2, or when a level of the torque voltage $T_V$ is 2.7 V or less despite the rightward turning of the input shaft 2, the steering wheel 1 is in a range to be considered to have returned to the middle point. Accordingly, with the steering wheel 1 being in this range, the control flag CF is set to "0" in Step S5 or Step S7 and that the steering wheel 1 is positioned substantially at the middle point is stored.

Thus in Steps S3 through S7, determination is made as to whether or not the steering wheel 1 is in a range in which it is considered to have returned to the middle point; if the steering wheel 1 is in this range, "0" is written in the control flag CF.

In the subsequent Steps S8, S9 and S11, a level of the torque voltage $T_V$ is determined. As shown in FIG. 3, when the steering wheel 1 is at the middle point, a level of the torque voltage $T_V$ is 2.5 V, and the level varies depending upon whether the steering wheel 1 is turned to the right or to the left. If $T_V<2.5$ V, it is determined that the steering wheel 1 is turned to the left, otherwise it is determined that the steering wheel 1 is turned to the right (Step S8).

If the steering wheel 1 is turned to the left, whether a torque voltage $T_V$ is 1.9 V or less is determined. If $T_V>1.9$ V, it is determined that the steering wheel 1 is in the range of play, as shown in FIG. 3, wherein the steering wheel 1 is not practically involved in the steering operation, and therefore, the flow proceeds to Step S22, omitting the warning control.

If $T_V \leq 1.9$ V, the vehicle is changing its travelling course by turning the steering wheel 1 to the left, and accordingly, the direction flag DF is set to "1" at this time (Step S10). If the torque voltage $T_V$ marks more than 2.5 V in Step S8, it is determined that the steering wheel 1 is turned to the right, and whether the torque voltage $T_V$ at this time is 3.1 V or more is determined (Step S11). If the torque voltage $T_V$ is less than 3.1 V, the steering wheel 1 is in the so-called range of play wherein the steering wheel 1 is not practically involved in the steering operation, and therefore, the flow proceeds to Step S22, omitting the warning control. If, on the other hand, the torque voltage $T_V$ is 3.1 V or more, the vehicle is changing its travelling course by turning the steering wheel 1 to the right. Accordingly, the direction flag DF is set to "0" at this time, and that the steering wheel 1 is turned rightward is stored (Step S12).

Thereafter, the content of the control flag CF is determined (Step S13). If the control flag CF is "0" indicating that the steering wheel has returned to the middle point, the vehicle is moving straight, and in this state the steering operation will be started. At this time, the content of the direction flag DF is determined (Step S14); if the steering wheel 1 is turned leftward, a torque voltage $T_V$ 50 milliseconds before is compared to 1.9 V, which is a boundary value for determining whether the steering wheel 1 is in the range of play or not (Step S15). If the steering wheel 1 is out of the so-called range of play, and is therefore involved in the steering operation, the mild warning control against the leftward turning of the steering wheel performed such that the warning control may be performed without interfering with the steering operation (Step S16).

On the other hand, if the steering wheel 1 is in the range of play, the vehicle is moving straight; in order to keep the vehicle moving straight, strong warning control against the leftward turning of the steering wheel is performed thereby inhibiting the turning of the steering wheel (Step S17).

Similarly in Step S14, if the direction flag DF is "0" indicating that the steering wheel 1 is turned rightward, then whether the torque voltage $T_V$ 50 milliseconds before is more than 3.1 V or not is determined (Step S18). If it is 3.1 V or more, the mild warning control against the rightward turning of the steering wheel is performed (Step S19). On the other hand, if a torque voltage $T_V$ 50 milliseconds before is less than 3.1 V, the strong warning control against the rightward turning of the steering wheel is performed (Step S20).

If, in Step S13, the control flag CF is "1" indicating that the steering wheel 1 has not returned to the middle point, the state of the direction flag DF is determined in Step S21; if the steering wheel 1 is turned leftward, the mild warning control against the leftward turning thereof is performed (Step S16). If the steering wheel 1 is turned rightward, the mild warning control against the rightward turning thereof is performed (Step S19).

In this manner, in the warning control, the motor 13 produces either a weak or a strong "adverse assist" force (a counteractive force against turning of the steering wheel) depending upon whether the steering wheel 1 is practically involved in the steering operation or is in the vicinity of the middle point. The reason for providing different levels of the "adverse assist" force is because if a great "adverse assist" force is applied to the steering wheel 1 while the driver is turning it, the driver may feel as if the steering wheel 1 were forced back, and therefore, a need exists for causing such a mild vibration in the steering wheel 1 as may not make the driver feel that way.

On the other hand, when the vehicle is moving straight, the application of such a great "adverse assist" force does not make the driver feel as if the steering wheel were forced back, and therefore, a strong warning control is performed to cause a relatively strong vibration in the steering wheel 1.

When the steering wheel 1 is in the range of play, the warning control is not performed, and in Step S22, a target current value of the motor 13 is subject to the limiter processing using a current value for the normal steering assist control. Based on a count value of the torque counter TC1, a torque voltage $T_V$ applied by the torque sensor 10 is sampled every 10 milliseconds to be stored in the torque voltage register TVR1 (Step S23-1). In the torque voltage register TVR1, the oldest data is abandoned and new data is written. Based on a count value of the torque counter TC2, a torque voltage $T_V$ applied by the torque sensor 10 is sampled every 100 milliseconds to be stored in the torque voltage register TVR2 (Step S23-2). In the torque voltage register TVR2, the oldest data is abandoned and new data is written.

Thereafter, the normal steering assist control is performed using a current value limited in Step S22 (Step S24).

If, in Step S2, the danger avoidance counter DAC is not "0", indicating that the warning control has already started, the state of the direction flag DF is determined in Step S25; if the steering wheel 1 is turned leftward, the state of the control flag CF is determined (Step S25). Similarly if the steering wheel 1 is turned rightward, the state of the control flag CF is determined (Step S27). The control flag CF indicates whether the steering wheel 1 has returned to the middle point or not; depending upon the indication of the control flag CF, there is performed one of the warning controls, that is, against the rightward turning of the steering wheel (strong), against the rightward turning thereof (mild), against the leftward turning thereof (strong) and against the leftward turning thereof (mild), as shown in FIGS. 8 through 11 respectively.

Figure 8:
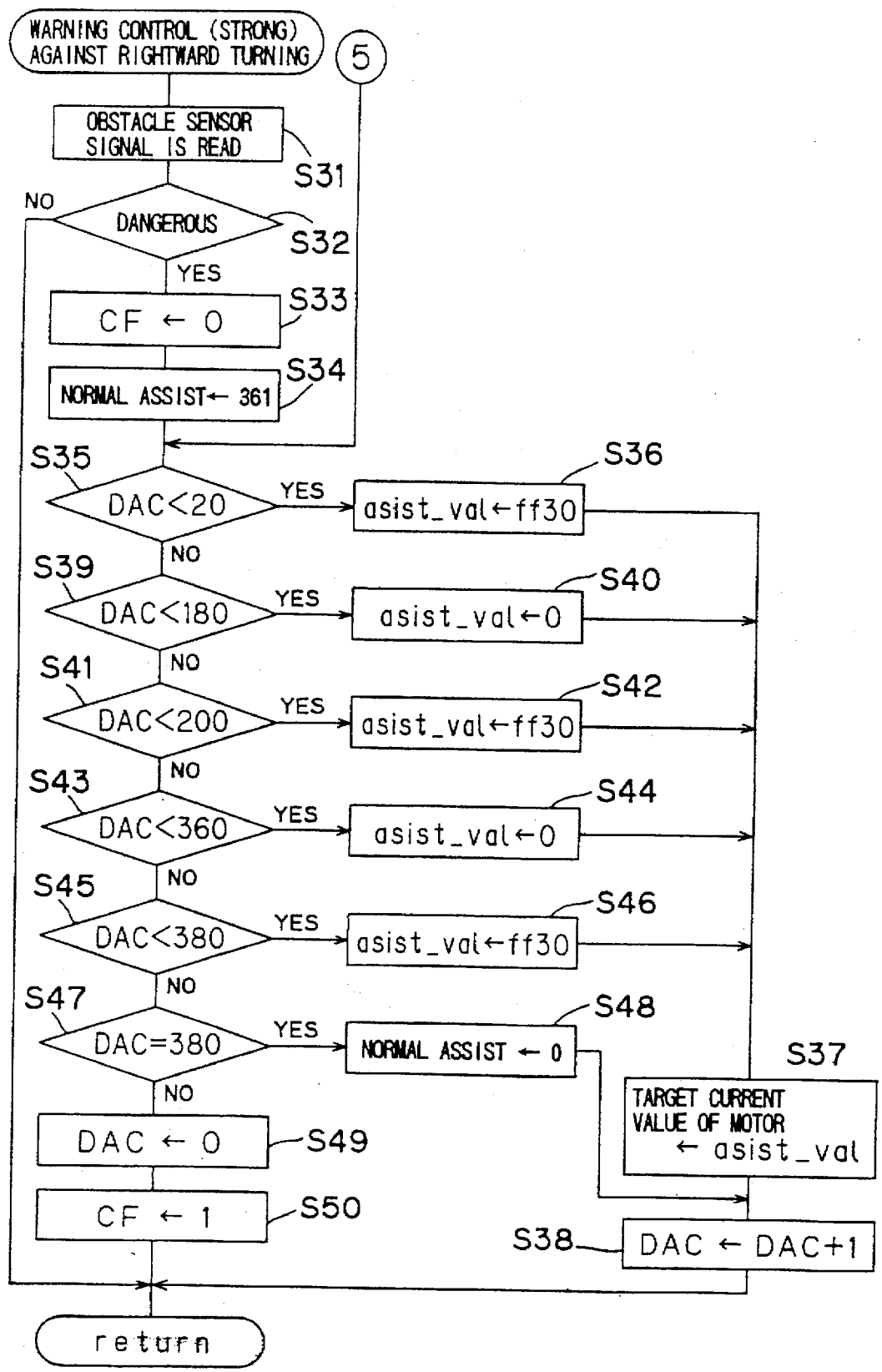
FIG. 8 is a detailed flow chart showing the routine of warning control (strong) against the rightward turning of the steering wheel.

FIG. 8 is a detailed flow chart showing the routine of the strong warning control against the rightward turning of the steering wheel 1.

Referring to FIG. 8, firstly a signal indicative of danger applied by the obstacle sensor 15 is read in (Step S31) for determination whether a dangerous situation exists or not (Step S32).

When it is determined that there is a situation, the control flag CF is set to "0" and a maximum value of the current supplied to the motor 13 is set to, for example, "361" corresponding to 65A (Step S34). Then, the danger avoidance counter DAC is caused to start counting with a control current value set to "ff30" while its count is less than "20" (Steps S35, S36), and the motor 13 is regulated using the set current value as the target current value of the motor 13 (Step S37). A count value of the danger avoidance counter DAC is incremented by 1 every 0.5 milliseconds (Step S38).

Thus, the motor 13 is driven so as to output a leftward assist force for 10 milliseconds which counters the rightward turning of the steering wheel 1.

Nextly, the control current value is set to "0" while the count value of the danger avoidance counter DAC is in a range from 20 to less than 180 (Steps S39, S40) so that no current is applied to the motor (Step 37). Then, the count value of the danger avoidance counter DAC is incremented (Step S38).

This brings the motor into the "non-assist" state for 80 milliseconds.

Thereafter, while the count value of the danger avoidance counter DAC is in a range from 180 to less than 200, the control current value is set again to "ff30" so that the current of that value may be applied to the motor 13, and the count value of the counter DAC is incremented (Step S41→S42→S37→S38). Accordingly, the motor 13 produces an "adverse assist" force for 10 milliseconds.

In like manner, the "non-assist" state for 80 milliseconds keeps alternating with the "adverse-assist" state for 10 milliseconds (Steps S43–S46) until the count value of the danger avoidance counter DAC reaches "380" (Step S47), when the control current value is set to "0" for the normal steering assist control (Step S48).

The current value for the normal steering assist control is set to "0" in order to prevent the warning control from being abruptly switched to the normal steering assist control at a high current value. If the danger avoidance counter DAC does not equal 380 in Step S47, then this counter is set to "0" (Step S49) and the control flag CF is set to "1" (Step S50).

Figure 9:
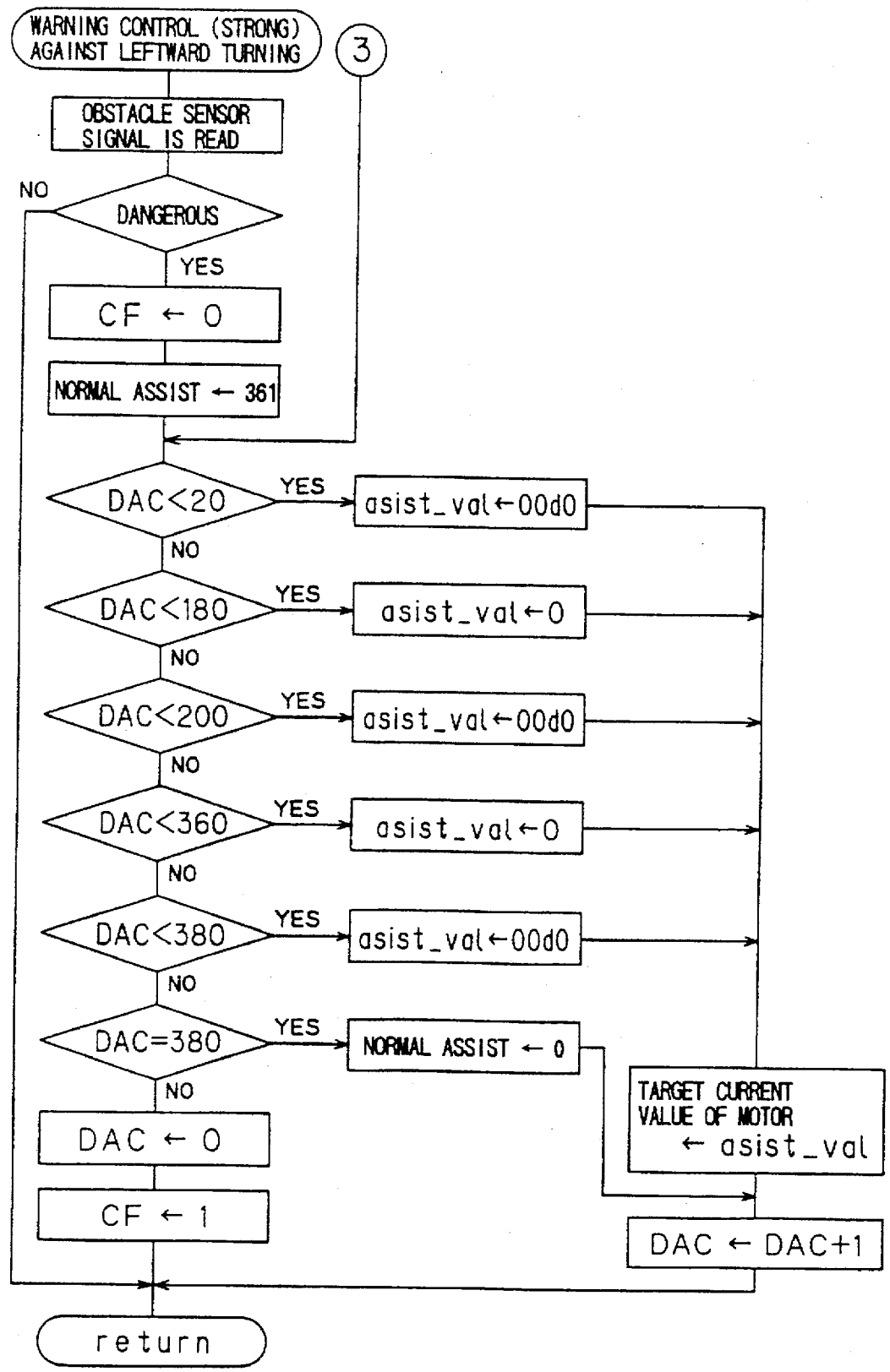
FIG. 9 is a detailed flow chart showing the routine of warning control (strong) against the leftward turning of the steering wheel.

FIG. 9 is a flow chart showing the routine of the strong warning control against the leftward turning of the steering wheel 1. This flow chart has the same content as that of the warning control against the rightward turning thereof (strong) as shown in FIG. 8, except that current values set in accordance with count values of the danger avoidance counter DAC are different.

Figure 10:
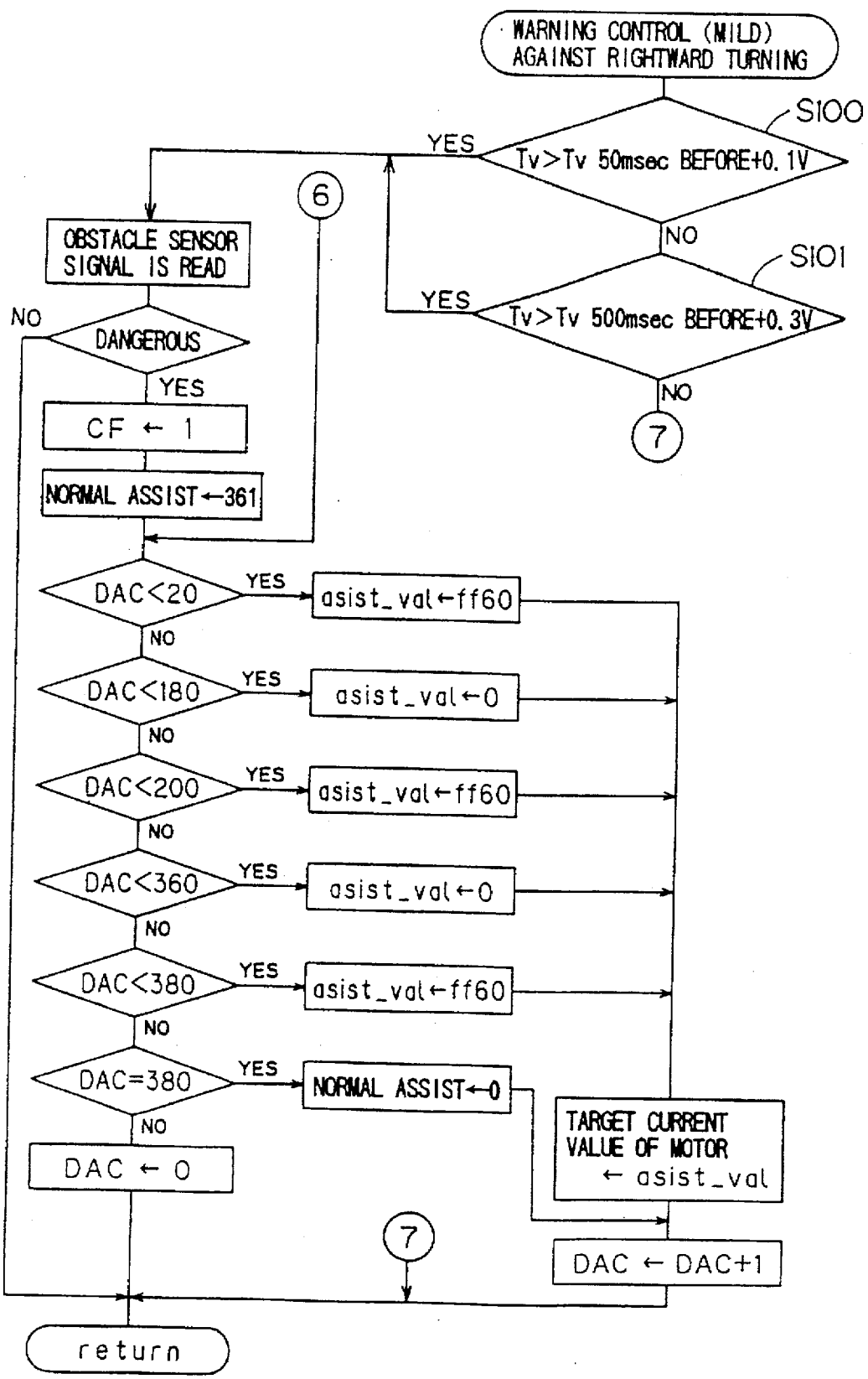
FIG. 10 is a detailed flow chart showing the routine of warning control (mild) against the rightward turning of the steering wheel.
Figure 11:
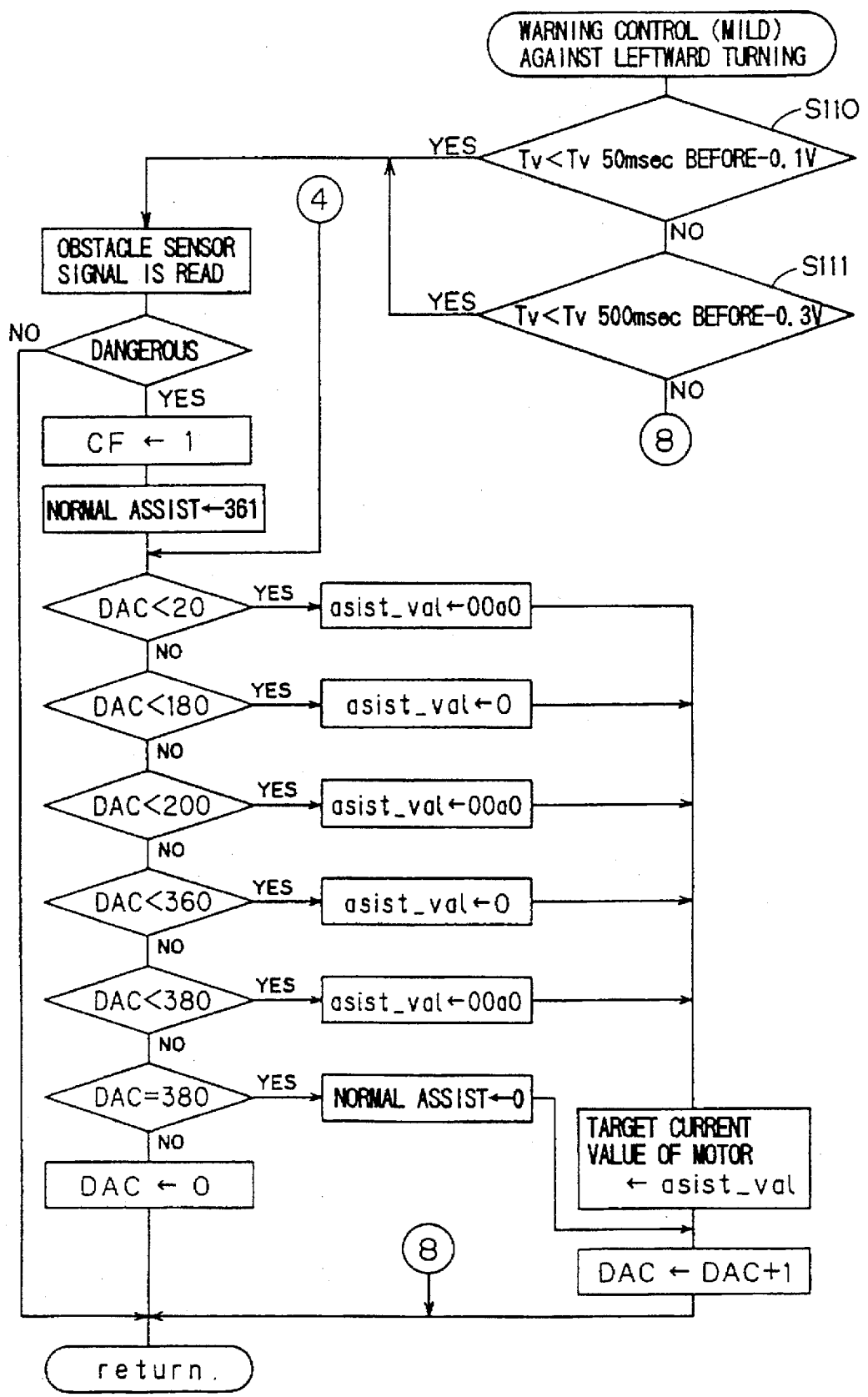
FIG. 11 is a detailed flow chart showing the routine of warning control (mild) against the leftward turning of the steering wheel.

The flow charts showing the routines of the warning control against the rightward turning of the steering wheel 1 (mild) and against the leftward turning thereof (mild), shown in FIGS. 10 and 11 respectively, have the same content as that shown in FIG. 8, except that current values set in accordance with count values of the danger avoidance counter DAC are different and that the following steps are performed: before reading a signal indicative of danger, determination is made in Step S100 whether or not the torque voltage $T_V$ is greater than the value of $T_V$ 50 milliseconds before plus 0.1 V or not, thereby detecting a quick turning of the steering wheel 1, whereas determination is made in Step S101 whether or not the torque voltage $T_V$ is greater than $T_V$ 500 milliseconds before plus 0.3 V, thereby detecting a slow turning of the steering wheel 1; and before reading a signal indicative of danger, determination is made in Step S110 whether or not the torque voltage $T_V$ is less than $T_V$ 50 milliseconds before minus 0.1 V, thereby detecting a quick turning of the steering wheel 1, whereas determination is made in Step S111 whether or not the torque voltage $T_V$ is less than $T_V$ 500 milliseconds before minus 0.3 V, thereby detecting a slow turning of the steering wheel 1.

If the aforesaid warning control is performed, vibration is caused in the steering wheel 1. The algorithm of vibration production, or the contents of the warning controls shown in FIGS. 8 through 11 is summarized as follows:

(a) for a period of 10 milliseconds: a target current value of the motor is set to a value which is counter to that of a steering force ("adverse assist");

(b) for a period of 80 milliseconds: a target current value of the motor is set to "0" ("non-assist");

(c) for a period of 10 milliseconds: a target current value of the motor is set to a value counter to that of a steering force;

(d) for a period of 80 milliseconds: a target current value of motor is set to "0";

(e) for a period of 10 milliseconds: a target current value of the motor is set to a value counter to that of a steering force; and (f) for a period of 0.5 milliseconds: normal steering assist control (warning interval).

The above described control steps (a) through (f) are repeated until it is determined that there is no dangerous situation.

The aforementioned specific millisecond periods are given merely by way of example, and in principle, a period of any milliseconds that allows the steering wheel 1 to be vibrated in a rhythmic pattern may be used.

The warning control according to the embodiment described above adopts a set of three periods of vibration to be caused in the steering wheel 1. In dangerous situations, however, the steering wheel 1 may be caused to vibrate continuously regardless of the number of vibrations of the set.

What is claimed is:

1. An electric power steering system which is combined with a steering mechanism including a steering wheel and which has a motor for producing a steering assist force when a vehicle is steered by means of the steering wheel, comprising:

obstacle detecting means for detecting the presence of an obstacle in the periphery of the vehicle, and warning control means for driving the motor to cause vibration in the steering wheel when an obstacle is detected by the obstacle detecting means.

2. An electric power steering system as set forth in claim 1, further comprising means for determining whether the steering wheel is turned or not, wherein said warning control means drives the motor so as to vibrate the steering wheel stronger when the steering wheel is not turned than when it is turned.

3. An electric power steering system as set forth in claim 2, wherein said warning control means does not perform warning control when the steering wheel is in a range of play about a middle point of a total range of rotation of the steering wheel, at which the steering wheel is not practically involved in steering operations of the vehicle.

4. An electric power steering system as set forth in claim 2, wherein
said warning control means regulates a value of current applied to the motor to a predetermined target value, and cyclically fluctuates said target value when an obstacle is detected by the obstacle detecting means.

5. An electric power steering system as set forth in claim 2, wherein said warning control means regulates a value of voltage applied to the motor to a predetermined target value, and cyclically fluctuates said target value when an obstacle is detected by the obstacle detecting means.

6. An electric power steering system as set forth in claim 1, wherein
said warning control means drives the motor so as to produce an intermittent counteractive force against turning of the steering wheel.

7. An electric power steering system as set forth in claim 1, wherein
said warning control means provides control such that the motor alternates an adverse-assist state wherein the motor produces a counteractive force against turning of the steering wheel, and a non-assist state wherein the motor produces no counteractive force.

8. An electric power steering system comprising:
a motor which is combined with a steering mechanism including a steering wheel, for producing a steering assist force when a vehicle is steered by means of the steering wheel;

sensor means for detecting a moving state of the vehicle;

drive means for driving said motor using a target control value based on a detection output from said sensor means;

danger forecast means for forecasting danger which may be caused by the approach of an obstacle; and warning control means which cyclically fluctuates the target control value to cause vibration in said steering wheel when danger is forecasted by the danger forecast means.

9. An electric power steering system as set forth in claim 8, further comprising
means for determining whether the steering mechanism is being operated or not, wherein
said warning control means fluctuates the target control value such that a strength of vibration in the steering wheel is stronger when the steering mechanism is not operated than when it is operated.

10. A safety precaution device applicable to a steering system including a steering wheel for changing a travelling course of a vehicle comprising:
obstacle detecting means for detecting the presence of an obstacle in the periphery of a vehicle; and means for causing vibration in said steering wheel if, when an obstacle has been detected by said obstacle detecting means, said steering wheel is turned to change the travelling course of the vehicle toward the obstacle thus detected;

wherein said steering system includes a motor for producing a steering assist force when the steering wheel is turned; and wherein said means for causing vibration causes the motor to produce an intermittent counteractive force against turning of the steering wheel, thereby vibrating the steering wheel.

* * * * *